(No Model.)
J. D. HALFPENNY.
MOUTH OPENER FOR ANIMALS.
No. 442,180. Patented Dec. 9, 1890.
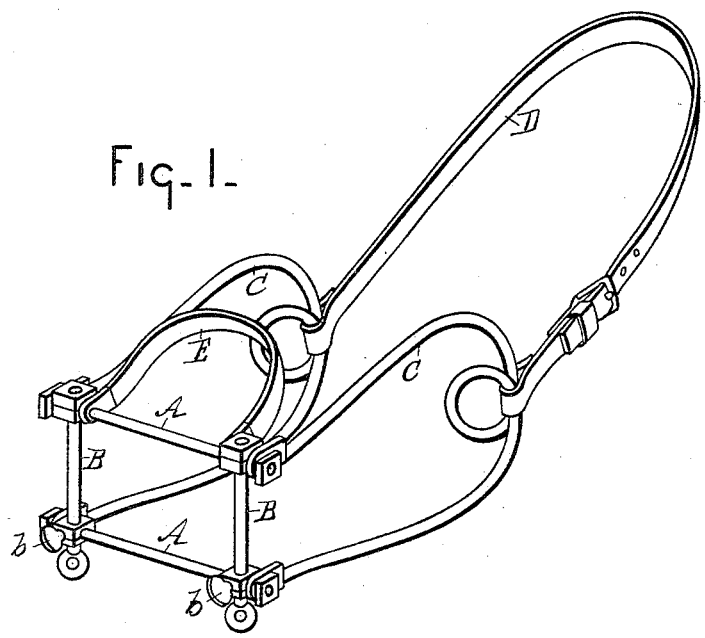
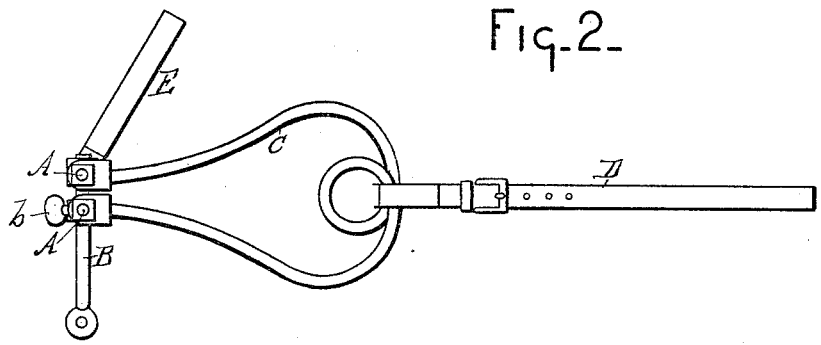
WITNESSES
C. J. Shipley
F. Clough
INVENTOR
James D. Halfpenny
By Wells W. Leggett & Co.
Attorneys.

ated December 9, 1890.
UNITED STATES PATENT OFFICE.

JAMES D. HALFPENNY, OF PONTIAC, MICHIGAN.

MOUTH-OPENER FOR ANIMALS.

SPECIFICATION forming part of Letters Patent No. 442,180, dated December 9, 1890.

Application filed April 17, 1890. Serial No. 348,397. (No model.)

*To all whom it may concern:*

Be it known that I, JAMES D. HALFPENNY, a citizen of the United States, residing at Pontiac, county of Oakland, State of Michigan, have invented a certain new and useful Improvement in Mouth-Openers for Animals; and I declare the following to be a full, clear, and exact description of the invention, such as will enable others skilled in the art to which it pertains to make and use the same, reference being had to the accompanying drawings, which form a part of this specification.

In the drawings, Figure 1 is a perspective view of the apparatus when in use. Fig. 2 is a side elevation of the apparatus closed preparatory to entering the animal's mouth.

It is the purpose of my invention to produce an apparatus to facilitate the administration of medicines to horses or other animals, or to facilitate working in the mouths of such animals upon their teeth or adjacent organs reached through the mouth. To this end I provide two bars designed to enter the mouth of the horse, cow, or other animal the same as a bit, and at the end of each bar A, I cause the same to engage an upright rod B. These rods may be fastened rigidly to one of the bars A and be caused to pass freely through the other cross-bar, and I provide thumb-screws $b$ or other similar means, whereby the said movable bar may be fastened rigidly at any place along the said upright rods B.

C C represent two springs. Each has one of its ends attached to opposite ends of one of the bars A, while the other end of each is attached to opposite ends of the other bar A.

D is a strap or other convenient means whereby the apparatus may be attached to the head of the horse or other animal.

E is a strap, which may be passed over the nose of the horse, if desired, to assist in holding the head of the animal up at any desired elevation for administering medicines or for convenience in operating upon the horse.

The operation of the device is as follows: The cross-bars A are first forced together and fastened by the thumb-screws $b$. These bars are then put in the mouth, the same as those of an ordinary bridle, and the strap D is adjusted over the head to hold it in place, so as to leave the cross-bars just back of the front teeth. The thumb-screws are then released and the resiliency of the springs instantly forces the mouth open and holds it open. Now if it is desired to administer medicines or to work in the mouth the thumb-screws may be set and so hold the horse from closing his mouth, even should he try to do so. If, however, it is desired that the animal may swallow, and for this purpose close his mouth, it is only necessary to release the thumb-screws, when by an effort he can do so with ease. If it is desired to file the animal's teeth, the mouth can be held open just as far as may be necessary and no farther. If desired, the apparatus may be used as an ordinary bridle-bit in going from place to place.

What I claim is—

1. A device for holding open the mouth of an animal, consisting of two cross-bars A, movable to and from each other, springs for forcing the cross-bars apart, and devices for rigidly holding the cross-bars in any desired relation to each other, substantially as described.

2. A device for holding open an animal's mouth, consisting of two cross-bars A and upright rods B, one of said cross-bars adapted to slide freely along said rods, means for setting said movable cross-bar at any position of adjustment along said upright rods, and springs for forcing said cross-bars apart, substantially as and for the purposes described.

3. A device for holding open the mouths of animals, the same consisting of two cross-bars A, springs C, adapted to extend up along the sides of the animal's head, and means for fastening the said springs in position, substantially as and for the purposes described.

4. A device for holding open an animal's mouth, the same consisting of two cross-bars A, rod or rods B, thumb-screws or equivalent $b$, springs C, and strap D, substantially as described.

5. A device for holding open the mouths of animals, the same consisting of the cross-bars A, uprights B, and fastening appliance $b$, in combination with springs C and straps D and E, substantially as and for the purposes described.

In testimony whereof I sign this specification in the presence of two witnesses.

JAMES D. HALFPENNY.

Witnesses:
C. J. SHIPLEY,
M. A. REEVE.